(12) United States Patent
Dobyns et al.

(10) Patent No.: US 10,107,649 B2
(45) Date of Patent: Oct. 23, 2018

(54) TEST AND MEASUREMENT INSTRUMENT USING COMBINED SIGNALS

(75) Inventors: Kenneth P. Dobyns, Beaverton, OR (US); Kristie L. Veith, Portland, OR (US); Terrance R. Beale, Portland, OR (US)

(73) Assignee: Tektronix, Inc., Beaverton, OR (US)

( * ) Notice: Subject to any disclaimer, the term of this patent is extended or adjusted under 35 U.S.C. 154(b) by 0 days.

(21) Appl. No.: 12/564,800

(22) Filed: Sep. 22, 2009

(65) Prior Publication Data

US 2011/0071795 A1    Mar. 24, 2011

(51) Int. Cl.
*H03F 1/26* (2006.01)
*G01D 5/244* (2006.01)

(52) U.S. Cl.
CPC .................... *G01D 5/244* (2013.01)

(58) Field of Classification Search
USPC .......................................... 702/189
See application file for complete search history.

(56) References Cited

U.S. PATENT DOCUMENTS

| 4,768,208 | A | * | 8/1988 | Cornett ......................... 375/342 |
| 5,530,454 | A | * | 6/1996 | Etheridge .......... G01R 13/0227 |
| | | | | 345/440.1 |
| 6,201,993 | B1 | * | 3/2001 | Kruse ................ A61N 1/37211 |
| | | | | 128/903 |
| 6,892,150 | B2 | * | 5/2005 | Pickerd et al. .................. 702/67 |
| 7,058,548 | B2 | * | 6/2006 | Pupalaikis et al. ........... 702/189 |
| 7,398,175 | B2 | * | 7/2008 | Tran ....................... G01R 13/32 |
| | | | | 702/121 |
| 2004/0267470 | A1 | * | 12/2004 | Fender et al. .................. 702/67 |
| 2005/0249037 | A1 | | 11/2005 | Kohn |
| 2008/0047358 | A1 | * | 2/2008 | Petroff ....................... 73/861.27 |
| 2008/0284410 | A1 | | 11/2008 | Perez |

FOREIGN PATENT DOCUMENTS

| JP | H05-203677 A | 8/1993 |
| JP | H056-203677 | 8/1993 |
| JP | 2002286761 A | 10/2002 |

* cited by examiner

*Primary Examiner* — Aditya Bhat
(74) *Attorney, Agent, or Firm* — Marger Johnson; Kevin D. Dothager

(57) ABSTRACT

A test and measurement instrument including a plurality of digitizers, each digitizer configured to digitize an input signal to generate a digitized signal; a signal processor configured to combine at least two of the digitized signals from the digitizers into a combined signal; and a circuit configured to receive the combined signal.

4 Claims, 3 Drawing Sheets

TEST AND MEASUREMENT INSTRUMENT USING COMBINED SIGNALS

BACKGROUND

This disclosure relates to test and measurement instruments, in particular to test and measurement instruments using combined signals.

Test and measurement instruments, such as oscilloscopes, logic analyzers, or the like, can acquire data by digitizing input signals. Such input signals can represent voltages, currents, temperatures, pressures, etc. The digitized input signals can be stored in an acquisition memory. Once an acquisition is triggered, the data can be read out of the acquisition memory as acquired data.

Such acquired data can be further processed using various waveform math functions. For example, one waveform can be subtracted from another. However, such waveform math is performed entirely after the data has been acquired, transferred among different memories, or the like.

SUMMARY

An embodiment includes a test and measurement instrument including a plurality of digitizers, each digitizer configured to digitize an input signal to generate a digitized signal; a signal processor configured to combine at least two of the digitized signals from the digitizers into a combined signal; and a circuit configured to receive the combined signal and at least one of the digitized signals.

Another embodiment includes a method including digitizing a plurality of input signals into a plurality of digitized signals; combining at least two of the digitized signals into a combined signal; and selecting from among the digitized signals and the combined signal in association with an acquisition.

DETAILED DESCRIPTION

Embodiments include test and measurement instruments and techniques where digitized signals can be combined into a combined signal. In an embodiment, the combined signal can be used substantially similarly to the source digitized signals.

Figure 1:
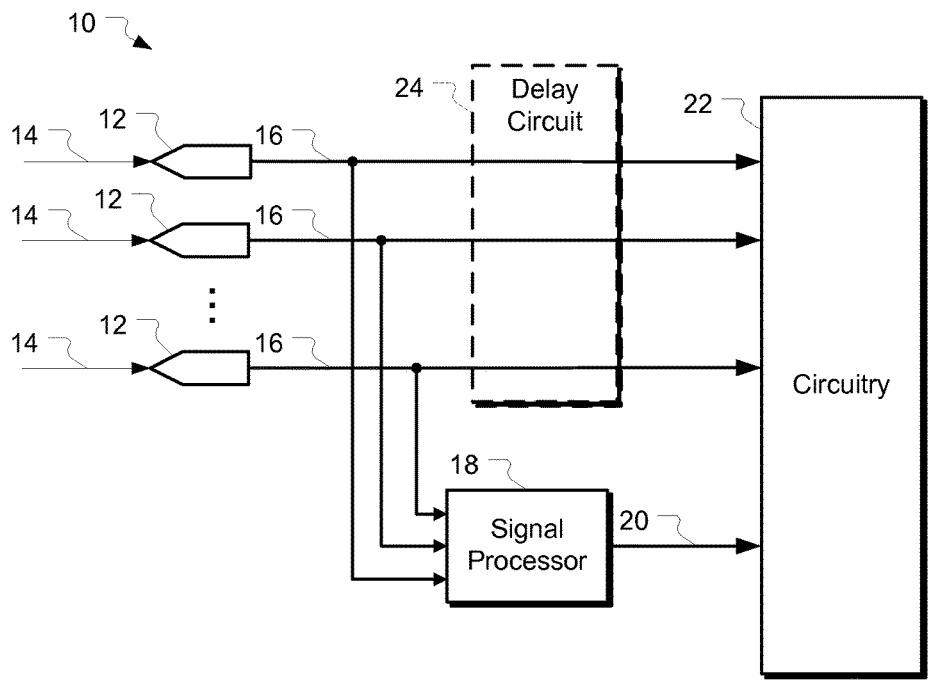
FIG. 1 is a block diagram of a test and measurement instrument using combined signals according to an embodiment.

FIG. 1 is a block diagram of a test and measurement instrument using combined signals according to an embodiment. In this embodiment, the test and measurement instrument 10 includes multiple digitizers 12. In this embodiment, three or more digitizers 12 are illustrated. However, in an embodiment, any number of digitizers greater than one can be used.

Each digitizer 12 is configured to digitize an input signal 14 to generate a corresponding digitized signal 16. For example, the input signal 14 can be any kind of signal that can be digitized. For example, the input signal 14 can be a voltage, a current, a temperature, a pressure, or any other parameter. In addition, the input signal 14 can be a different type of signal representing such parameters. For example, a voltage can represent a current converted by a transducer. Regardless, the digitizer 12 can be an appropriate digitizer to digitize such a signal. For example, the digitizer 12 can be an analog-to-digital converter (ADC) with a multi-bit output. Such an ADC can have a voltage input, a current input, or the like. In another example, the digitizer 12 can be a comparator configured to provide a one-bit output.

The test and measurement instrument 10 includes a signal processor 18. The signal processor 18 is configured to combine at least two of the digitized signals 16 from the digitizers into a combined signal 20. For example, the signal processor 18 can be coupled to each of the digitizers 12 and configured to receive each of the digitized signals 16. However, in another embodiment, the signal processor can be coupled to the digitizers 12 in different ways. For example, the digitized signals 16 that the signal processor 18 is configured to receive can be selected from among the digitized signals 16 through a switch or other routing circuitry. Regardless, the signal processor 18 has access to at least two digitized signals 16.

The signal processor 18 can be configured to combine the digitized signals 16 in a variety of ways. In one example, the signal processor 18 can be configured to multiply the digitized signals 16 together. If one digitized signal 16 represents a voltage and another digitized signal 16 represents a current, the combined signal 20 can represent a corresponding power. In another example, one digitized signal 16 can be a gating signal that can be used to gate out undesired portions of another digitized signal 16.

In another example, the signal processor 18 can be configured to subtract one digitized signal 16 from another digitized signal 16. Thus, the combined signal 20 can represent a differential signal. Similarly, the signal processor 18 can be configured to add one digitized signal 16 to another digitized signal 16, representing a common mode signal.

Moreover, although operations such as multiplication, addition, and subtraction have been described, any mathematical combination can be used. For example, one or more of the digitized signals 16 can be filtered, a digitized signal 16 can be used to modulate or demodulate another digitized signal 16, the digitized signals 16 can be combined using linear or non-linear techniques, or the like. Thus, the signal processor 18 can be configured to combine multiple digitized signals 16 into the combined signal 20 as desired.

The signal processor 18 can be any variety of circuitry. For example, the signal processor 18 can be a digital signal processor, a programmable gate array, an application specific integrated circuit, a discrete logic circuit, a combination of such circuitry, or the like.

In an embodiment, the signal processor 18 can be configured to combine at least two of the digitized signals 16 into the combined signal 20 substantially simultaneously with the digitization of the corresponding input signals 14. That is, as the digitized data of a digitized signal 16 is output from the corresponding digitizer 12, the digitized data can be input into the signal processor 18. Using the example of multiplication to measure a power, one digitizer 12 can output a value indicating an instantaneous voltage. Another digitizer 12 can output a value indicating a corresponding instantaneous current. When these two values are multiplied in the signal processor 18, the output value of the combined signal 20 is the instantaneous power. Although a propagation delay through the signal processor 18 can offset the combined signal 20 in time from the source digitized signals 16, the circuitry 22 can be configured to accommodate such a delay. For example, a delay can be introduced into the digitized signal 16 such that the digitized signals 16 and the combined signal 20 are aligned in time.

In an embodiment, the test and measurement instrument 10 can include a delay circuit 24. The delay circuit 24 can be configured to time-align the digitized signals 16 and the combined signal 20. Thus, when the signals are incident on the circuitry 22, the signals can be substantially time-aligned.

Although the delay circuit 24 is illustrated as operating on the digitized signals 16, the delay circuit can include portions of the signal processor 18, a combination of such circuits, or the like. Any circuit that can introduce a relative time offset between the digitized signals 16 and the combined signal 20 can be used as a delay circuit 24.

In an embodiment, the processing of the signal processor 18 is not performed in a post-processing fashion. That is, the combined signal 20 can be generated at substantially the same time, rather than being generated after full sets of the digitized signals 16 are acquired. The combined signal 20 can be used by the circuitry 22 in a manner as if the combined signal 20 was a digitized signal 16 occurring at substantially the same time.

In an embodiment, the circuitry 22 can be any variety of circuitry that can process the digitized signals 16. As will be described in further detail below, the circuitry 22 can be configured to use the combined signal 20 just as the other digitized signals 16 could be used. In particular, a selection can be made from among the digitized signals 16 and the combined signal 20 in association with an acquisition.

In an embodiment, the test and measurement instrument 10 can include means for digitizing a plurality of input signals into a plurality of digitized signals; means for combining at least two of the digitized signals into a combined signal; and means for acquiring data in response to the combined signal.

The means for digitizing the input signals into the digitized signals 16 can include any variety of the digitizers 12 described above. The means for combining at least two of the digitized signals into a combined signal 20 can include any variety of the signal processor 18 described above. The means for acquiring data in response to the combined signal 20 can include trigger circuitry, acquisition memories, signal conditioning circuitry, associated controllers, or any other circuit used in acquiring data such as the circuitry 22, described above.

In an embodiment, the digitizers 12 can be configured to substantially continuously digitize the input signals 14. Accordingly, the digitized signals 16 can be substantially continuously presented to the circuitry 22. Similarly, the signal processor 18 can be configured to substantially continuously combine the desired digitized signals 16. Thus, the combined signal 20 can also be substantially continuously presented to the circuitry 22. The circuitry 22 can use any of the digitized signals 16 and the combined signal 20 as a substantially continuous signal.

Figure 2:
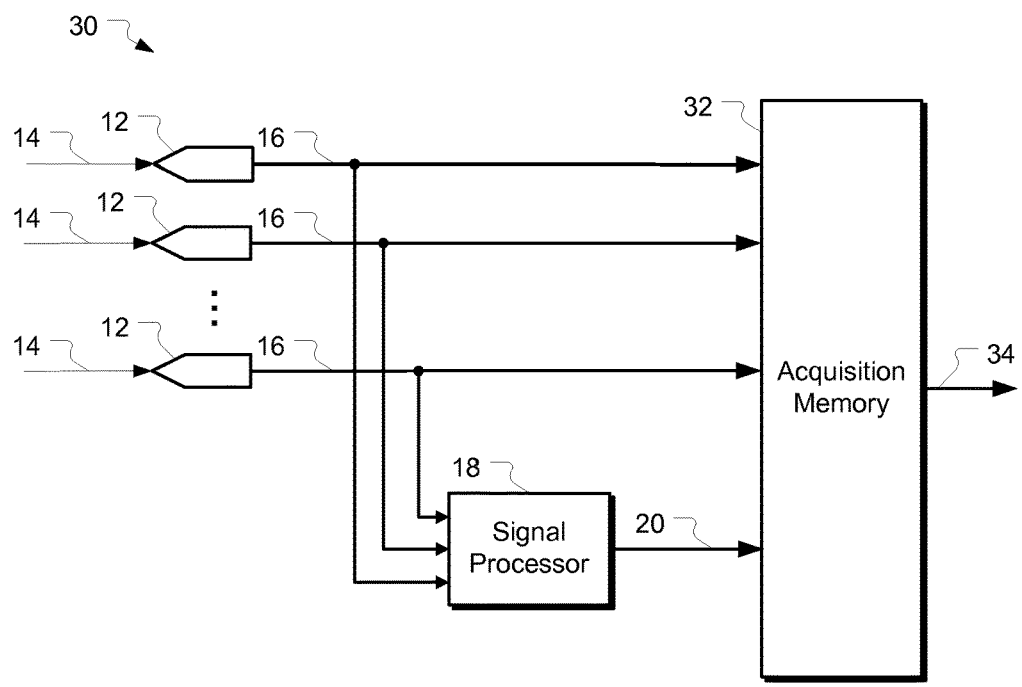
FIG. 2 is a block diagram of another test and measurement instrument storing a combined signal in an acquisition memory according to an embodiment.

FIG. 2 is a block diagram of another test and measurement instrument storing a combined signal in an acquisition memory according to an embodiment. In this embodiment, the test and measurement instrument 30 includes an acquisition memory 32 as part of the circuitry 22. That is, the acquisition memory 32 can be configured to receive the digitized signals 16 and the combined signal 20.

As used herein, acquisition memory 32 is memory that is configured to buffer incoming digitized data. For example, the acquisition memory 32 can be configured as a circular buffer where new values overwrite older values. Thus, a window of data can be stored in the acquisition memory 32. In particular, a window of data of the digitized signals and the combined signal can be stored.

Accordingly, when a trigger is generated, or data is otherwise to be acquired, the stored data can be read out as illustrated by data 34. In particular, the combined signal 20 can be treated as any other signal to be acquired. For example, in an embodiment, a trigger can be received. In response, the storing of the digitized signals 16 and the combined signal 20 in the acquisition memory 32 can be stopped, the storing can continue for a particular time, or the like.

The acquisition memory 32 can be any variety of memory. For example, the acquisition memory can be dynamic memory, static memory, volatile or non volatile memory, mass-storage device, or the like. Moreover, although a single memory has been illustrated, any number of memories can be used. For example each digitized signal 16 and each combined signal 20 can have a dedicated acquisition memory 32.

In an embodiment, the test and measurement instrument 30 can include means for storing the combined signal 20 and at least one of the digitized signals 16. The means for storing can include any variety of the acquisition memory 32 described above.

Figure 3:
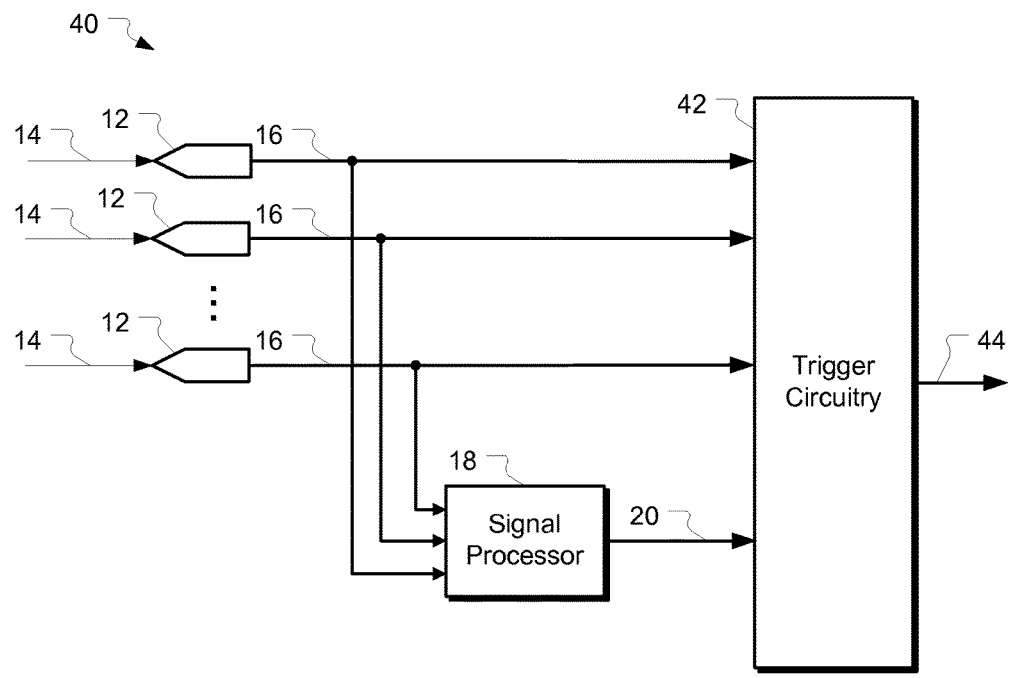
FIG. 3 is a block diagram of another test and measurement instrument using a combined signal as a trigger according to an embodiment.

FIG. 3 is a block diagram of another test and measurement instrument using a combined signal as a trigger according to an embodiment. In this embodiment, the test and measurement instrument 40 includes a trigger circuit 42. The trigger circuit 42 is configured to trigger an acquisition in response to at least one of the combined signal 20 and/or at least one of the digitized signals 16.

That is, the trigger circuit 42 can be configured to receive the combined signal 20 and one or more of the digitized signals 16. One or more of such signals can be used to trigger an acquisition. For example, in the combined signal 20 alone can be used to trigger an acquisition. In another example, a digitized signal 16 can be used to trigger an acquisition. In yet another example, the combined signal 20 can be used with one or more digital signals 16 to trigger an acquisition.

In particular, as described above, the combined signal 20 can represent a variety of other signals, such as power, a differential signal, a common mode signal, or the like. As the combined signal 20 representing such signals is presented to the trigger circuit 42, the trigger circuit 42 can generate a trigger signal 44 in response to such signals. For example, an acquisition can be triggered in response to a change in power. Thus, an acquisition can be triggered in response to a signal that can have a different type, character, response, or the like as compared with one of the digitized signals 16.

The trigger circuit 42 can be any variety of circuit that can generate a trigger signal in response to a digitized signal such as the digitized signals 16 and the combined signal 20. For example, the trigger circuit 42 can be a digital signal processor, a programmable gate array, an application specific integrated circuit, a discrete logic circuit, a combination of such circuitry, or the like.

In an embodiment, the test and measurement instrument 40 can include means for triggering an acquisition in response to the combined signal. In particular, the test and measurement instrument 40 can include means for triggering the acquisition in response to the combined signal and at least one of the digitized signals. Such means for triggering can include any variety of the trigger circuit 42 described above.

Figure 4:
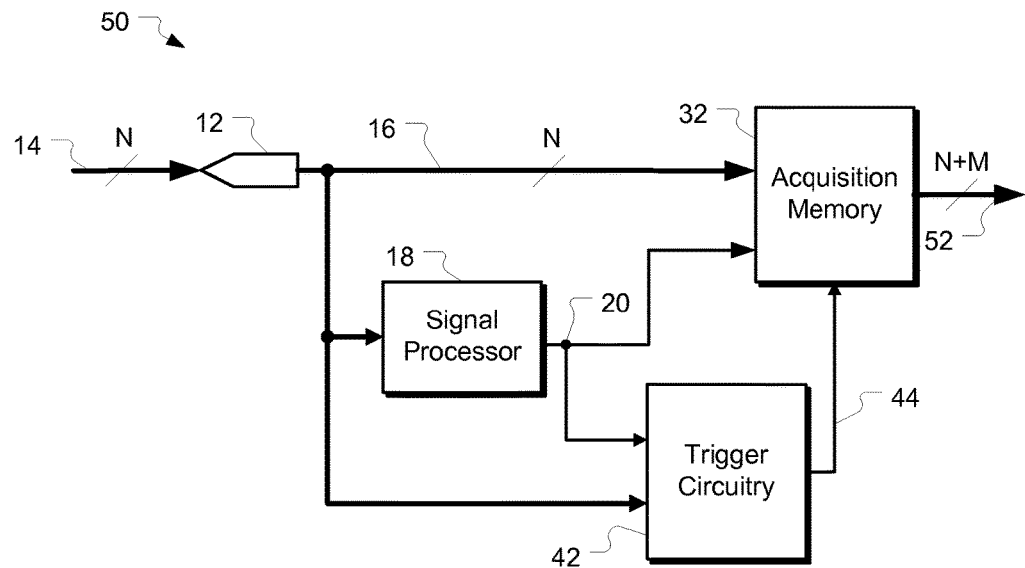
FIG. 4 is a block diagram of another test and measurement instrument storing a combined signal and using the combined signal as a trigger according to an embodiment.

FIG. 4 is a block diagram of another test and measurement instrument storing a combined signal and using the combined signal as a trigger according to an embodiment. In this embodiment, the test and measurement instrument 50 includes both an acquisition memory 32 and a trigger circuit 42. In particular, both the acquisition memory 32 and the trigger circuit 42 are configured to receive the combined signal 20. In this embodiment, for clarity, the multiple digitizers 12, input signals 14, and digitized signals 16 are combined, illustrating N such elements.

The acquisition memory 32 can be configured to respond to the trigger signal 44 from the trigger circuit 42. In particular, an acquisition can be triggered in the acquisition memory 32 of the combined signal 20 in response to a trigger signal 44 generated in response to the combined signal 20.

The acquisition memory 32 can be configured to store both the digitized signals 16 and the combined signal 20. Accordingly, any or all of such signals can be output as acquired signals 52. Moreover, one combined signal 20 has been used as an example; however, any number M combined signals 20 can be input to the acquisition memory from one or more signal processors 18. Accordingly, N+M acquired signals 52 can be output from the acquisition memory 32.

Although triggering and storing of a combined signal 20 in an acquisition memory 32 have been described above, as the combined signal 20 can be available at substantially the same time as the original digitized signals 16, the combined signal 20 can be used for any purpose as a digitized signal 16.

Figure 5:
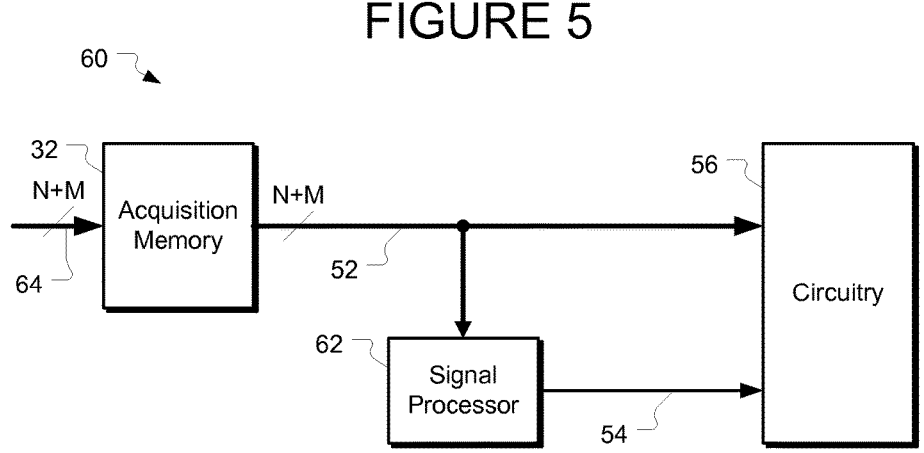
FIG. 5 is a block diagram of another test and measurement instrument generating a combined signal from data stored in an acquisition memory according to an embodiment.

FIG. 5 is a block diagram of another test and measurement instrument generating a combined signal from data stored in an acquisition memory according to an embodiment. In this embodiment, the test and measurement instrument 60 can include another signal processor 62 similar to the signal processor 18 described above. However, the signal processor 62 is configured to combine acquired signals 52 from the acquisition memory 32. That is, both the acquired signals 52 and another combined signal 54 can be substantially simultaneously presented to and subsequent processing 56.

As illustrated, the N+M acquired signals 52 can be received by the signal processor 62. That is, not only can the N digitized signals 16 stored in the acquisition memory 32 be combined, but the M combined signals 20 can be combined in the signal processor 62.

Moreover, in an embodiment, the acquisition memory 32 need not be configured to store a combined signal 20 as described above. That is, in an embodiment, the signal processor 62 can be the first signal processor capable of combining the digitized signals together encountered by the digitized signals. However, as the signal processor 62 can be configured to combine the digitized signals 52 substantially simultaneously as the digitized signals 52 are output from the acquisition memory 32, the combined signal 54 can be subsequently used as a digitized signal 52.

However, in an embodiment, a test and measurement instrument can include both such signal processors 18 and 62. For example, the signal processor 18 can be configured to generate the combined signal 20 for any use of a digitized signal 16 prior to the acquisition memory 32. If the combined signal 20 is not stored in the acquisition memory 32, additional memory can be available for other acquired signals. The signal processor 62 can be configured to create the second combined signal 54 from the signal stored in the acquisition memory. In an embodiment, the combined signal 54 can be substantially identical to the combined signal 20 generated by the signal processor 18; however, in other embodiments, the combined signal 54 can be different.

Although particular embodiments have been described, it will be appreciated that the principles of the invention are not limited to those embodiments. Variations and modifications may be made without departing from the principles of the invention as set forth in the following claims.

What is claimed is:
1. A test and measurement instrument, comprising:
   a plurality of digitizers, including a first digitizer configured to digitize a first input signal to generate a first digitized signal representative of the first input signal, and a second digitizer configured to digitize a second input signal to generate a second digitized signal representative of the second input signal;
   a signal processor coupled to receive the first and second digitized signals from the digitizers, the signal processor mathematically combining at least the first digitized signal directly with the second digitized signal into a combined digitized signal, wherein the combined digitized signal comprises:
      an unbalanced signal and the first input signal and the second input signal are a differential pair of signals,
      a common mode signal and the first input signal and the second input signal both represent voltages, or
      a power signal and the first input signal represents a voltage and the second input signal represents a current;
   an acquisition memory coupled to receive and store the combined digitized signal; and
   a trigger circuit coupled to receive the combined digitized signal and to trigger an acquisition in response to a characteristic of the combined digitized signal.

2. The test and measurement instrument of claim 1, wherein the acquisition memory is further configured to store at least one of the first and second digitized signals.

3. The test and measurement instrument of claim 1, further compromising:
   a first delay circuit coupled to receive the first digitized signal to substantially time-align the first digitized signal with respect to the combined digitized signal, and a second delay circuit coupled to receive the second digitized signal to substantially time-align the second digitized signal with respect to the combined digitized signal;
   wherein the acquisition memory is coupled to receive and store the combined digitized signal and at least one of the first and second time-aligned digitized signals.

4. A test and measurement instrument, comprising:
   a plurality of digitizers, including a first digitizer configured to digitize a first input signal to generate a first digitized signal representative of the first input signal, and a second digitizer configured to digitize a second input signal to generate a second digitized signal representative of the second input signal;
   a signal processor coupled to receive the first and second digitized signals from the digitizers, the signal processor mathematically combining at least the first digitized signal directly with the second digitized signal into a combined digitized signal, wherein the combined digitized signal comprises:
  an unbalanced signal and the first input signal and the second input signal are a differential pair of signals,
  a common mode signal and the first input signal and the second input signal both represent voltages, or
  a power signal and the first input signal represents a voltage and the second input signal represents a current; and
a trigger circuit coupled to receive the combined digitized signal and to trigger an acquisition in response to a characteristic of the combined digitized signal.

* * * * *